(12) United States Patent
Shin et al.

(10) Patent No.: US 11,495,791 B2
(45) Date of Patent: Nov. 8, 2022

(54) CATHODE ACTIVE MATERIAL AND LITHIUM SECONDARY BATTERY COMPRISING SAME

(71) Applicant: L&F CO., LTD., Daegu (KR)

(72) Inventors: Ji Hyun Shin, Daegu (KR); Sun Hye Lim, Daegu (KR); Joo Hyeong Woo, Daegu (KR); Su An Choi, Daegu (KR); Sang Hoon Jeon, Daegu (KR); Ji Sun An, Daegu (KR)

(73) Assignee: L&F CO., LTD., Daegu (KR)

( * ) Notice: Subject to any disclaimer, the term of this patent is extended or adjusted under 35 U.S.C. 154(b) by 512 days.

(21) Appl. No.: 16/620,042

(22) PCT Filed: Nov. 27, 2017

(86) PCT No.: PCT/KR2017/013615
§ 371 (c)(1),
(2) Date: Mar. 6, 2020

(87) PCT Pub. No.: WO2018/225912
PCT Pub. Date: Dec. 13, 2018

(65) Prior Publication Data
US 2020/0203717 A1    Jun. 25, 2020

(30) Foreign Application Priority Data
Jun. 7, 2017   (KR) .................. 10-2017-0070726

(51) Int. Cl.
*H01M 4/36*    (2006.01)
*H01M 4/525*   (2010.01)
(Continued)

(52) U.S. Cl.
CPC ........... *H01M 4/364* (2013.01); *H01M 4/525* (2013.01); *H01M 10/0427* (2013.01); *H01M 10/0525* (2013.01)

(58) Field of Classification Search
CPC .. H01M 4/364; H01M 4/525; H01M 10/0427; H01M 10/0525
See application file for complete search history.

(56) References Cited

U.S. PATENT DOCUMENTS 6,040,090 A * 3/2000 Sunagawa .............. C01G 53/42
                                              429/231.95
6,395,250 B2   5/2002 Matsubara et al.
(Continued)

FOREIGN PATENT DOCUMENTS

EP    0872450 A1 * 10/1998
EP    1321994 A2 *  6/2003 ............. C01G 51/42
(Continued)

OTHER PUBLICATIONS

International Search Report and Written Opinion dated Nov. 27, 2017 for International Patent Application No. PCT/KR2017/013675 (Korean and Translation).

*Primary Examiner* — Matthew J Merkling
(74) *Attorney, Agent, or Firm* — Plumsea Law Group, LLC (57) ABSTRACT

The present invention relates to a cathode active material, and a lithium secondary battery comprising the same, the present invention provides a cathode active material, represented by the following Chemical Formula 1, wherein I003/I104 ratio is 1.6 or more, and R-factor value represented by the following Formula 1 is 0.40 to 0.44, and c-axis lattice constant (c) and a-axis lattice constant (a) satisfy $3(a)+5.555 \leq (c) \leq 3(a)+5.580$:

$$R\text{-factor} = (I102 + I006)/(I101) \quad \text{Formula 1}$$

wherein I003, I006, I101, I102, and I104 are the intensity of diffraction peaks on the (003), (006), (101), (102), and (104) planes by X-ray diffraction analysis using CuKα-rays, $$Li_\alpha[(Ni_xCo_y)_{1-\beta}A_\beta]O_z \quad \text{Chemical Formula 1}$$

(Continued)

in the Chemical Formula 1, $0.95 \leq \alpha \leq 1.1$, $0.75 \leq x \leq 0.95$, $0.03 \leq y \leq 0.25$, $0 < \beta \leq 0.2$, and $1.9 \leq z \leq 2.1$, and A is a dopant metal element, and the average oxidation number N of A is $3.05 \leq N \leq 3.35$.

17 Claims, 3 Drawing Sheets

(51) Int. Cl.
    *H01M 10/04*    (2006.01)
    *H01M 10/0525*    (2010.01)

(56) References Cited

U.S. PATENT DOCUMENTS

| | | |
|---|---|---|
| 6,794,085 B2 | 9/2004 | Gao et al. |
| 9,608,261 B2 | 3/2017 | Ohara et al. |
| 2003/0047717 A1* | 3/2003 | Kim ............... H01M 10/0525 252/500 |
| 2008/0233481 A1 | 9/2008 | Kuzuo et al. |
| 2015/0380737 A1* | 12/2015 | Kawasato ............. H01M 4/505 252/521.2 |
| 2017/0125809 A1 | 5/2017 | Kim et al. |
| 2019/0252681 A1* | 8/2019 | Kaneda ................. C01G 53/04 |

FOREIGN PATENT DOCUMENTS

| | | |
|---|---|---|
| JP | 2001076724 A | 3/2001 |
| JP | 2006004811 A | 1/2006 |
| JP | 4595475 B2 | 4/2006 |
| JP | 2006107845 A | 4/2006 |
| JP | 2008218122 A | 9/2008 |
| JP | 2010064944 A | 3/2010 |
| JP | 5618116 B2 | 11/2014 |
| KR | 20000029966 A | 5/2000 |
| KR | 20080080938 A | 9/2008 |
| KR | 20120009779 A | 2/2012 |
| KR | 101538617 B1 | 2/2015 |
| KR | 20150015141 A | 2/2015 |
| KR | 20150122683 A | 11/2015 |
| KR | 20160123406 A | 10/2016 |
| KR | 20170050677 A | 5/2017 |

* cited by examiner

CATHODE ACTIVE MATERIAL AND LITHIUM SECONDARY BATTERY COMPRISING SAME

BACKGROUND OF THE INVENTION

(a) Field of the Invention

The present invention relates to a cathode active material, and a lithium secondary battery comprising the same.

(b) Description of the Related Art

In recent years, portableization and wirelessization of electronic devices such as AV devices and PCs are rapidly progressing, and as a driving power source for these devices, demand for secondary batteries having high energy density and small size and light weight is increasing.

In addition, the development and practical use of electric vehicles and hybrid vehicles for the global environment has recently been increasing the demand for lithium ion secondary battery having excellent storage properties in the medium-large size.

Under these circumstances, a lithium ion secondary battery having a high charge and discharge capacity and an excellent lifespan characteristic has been attracting attention.

Conventionally, as a cathode active material useful for a high energy type lithium ion secondary battery having a voltage of 4V, $LiMn_2O_4$ of spinel type structure, $LiMnO_2$ of zigzag layered type structure, $LiCoO_2$, $LiNiO_2$ of layered rock salt type structure, and the like are generally known, and among them, lithium ion secondary batteries using $LiNiO_2$ have attracted attention as batteries having high charge and discharge capacity.

However, since this material is inferior in thermal stability at the time of charge and durability of a charge and discharge cycle, further improvement of a characteristic is required.

That is, in the case of $LiNiO_2$, when lithium is extracted, $Ni^{3+}$ becomes $Ni^{4+}$, which causes Yantera strain to further extract Li in the region from which 0.45 of Li is extracted, then the crystal structure changes from monoclinic to hexagonal system.

Therefore, by repeating the charge and discharge reaction, the crystal structure becomes unstable so that the cycle characteristics deteriorate.

In order to solve this problem, studies have been made on a material in which Co and Al are added to a part of Ni of $LiNiO_2$, but a material which solved such a problem has not yet been obtained, and there is a demand for a higher crystalline Li—Ni composite oxide.

For this reason, various studies have been conducted on $LiNiO_2$ powders to improve various characteristic such as high capacity, control of crystallite size, stabilization of crystal structure, and thermal stability.

For example,
1. A technique for controlling the composition and improving the thermal stability so that the amount of tetravalent Ni is 60% or less in the Li—Ni composite oxide in which Li is released by charging (Patent Literature 1),
2. A technique to improve cycle characteristics, thermal stability and storage characteristics by substituting some Ni of Li—Ni composite oxide with at least one element selected from metal species comprising Co, Al and Mn and removing excessive Li after firing (Patent Literature 2),
3. A technique of containing at least one element oxide of B and P in a Li—Ni composite oxide, controlling crystallite size and improving thermal stability (Patent Literature 3),
4. The technique of stabilizing a crystal structure by substituting some Ni of Li—Ni composite oxide with Co and Al (Patent Literature 4), etc. have been known.

That is, the technique described in Patent Literature 1 controls the composition of the original Li—Ni composite oxide and improves the thermal stability so that the amount of tetravalent Ni is 60% or less in the Li—Ni composite oxide in which Li is desorbed by 75% by charging.

However, since a significant portion of Ni is replaced with Co and Mn in order to reduce the amount of tetravalent Ni to 60% or less, it is necessary to increase the charging voltage in order to achieve high capacity, and Additional measures, such as surface treatment, will be required to respond to changes in the internal environment of the battery due to the voltage increase.

Therefore, it is difficult to say that it is an optimal method of obtaining a Li—Ni composite oxide.

In addition, the technique described in Patent Literature 2 replaces a part of Ni of a Li—Ni composite oxide with at least one element selected from metal species comprising Co, Al, and Mn, and removes a considerable amount of Li after firing, thereby improving cycle characteristics, thermal stability and storage characteristics.

However, it is hard to say that Li removal treatment is sufficient as a method for producing a Li—Ni composite oxide that causes a decrease in capacity and expects a high discharge capacity.

In addition, the removal of Li by washing with water increases the specific surface area of the Li—Ni composite oxide, which promotes the reaction with the electrolyte during high temperature charging, thereby increasing the area causing side reactions between the particles and the electrolyte so that additional measures are required at the active material stage as described in Patent Literature 1.

In addition, the technique described in Patent Literature 3 is a technique of containing at least one element oxide of B and P in the Li—Ni composite oxide and improving thermal stability, but it is difficult to say that the method of obtaining a high discharge capacity is sufficient because the addition of elements such as B and P which are not involved in charge and discharge reactions, causes confusion of the crystal structure and lowered capacity.

In addition, since the firing temperature is low, the crystallite size is small and the exothermic peak is located at a low temperature, and when the crystallite size is small, the specific surface area of the Li—Ni composite oxide is increased, so that the reaction with the electrolyte solution at the time of high temperature charging is promoted, and further, it is difficult to say that the method of obtaining a Li—Ni composite oxide is sufficient because further measures are required to improve such problems.

Further, the technique described in Patent Literature 4 is a technique of stabilizing a crystal structure, enables high capacity and high output by substituting a part of Ni of Li—Ni composite oxide with Co and Al.

Although the Li site occupancy rate of the Li site in the crystal by the analysis of the lit belt analysis is 98.5% or more, and the metal site occupancy rate of the metal site is 95% or more, and 98% or less, and is intended to improve battery capacity and output characteristics, but it is not intended to improve cycle characteristics.

[Patent Literature 1] Japanese Laid-Open Patent Publication No. JP 2006-107845
[Patent Literature 2] Japanese Laid-Open Patent Publication No. JP 2010-064944
[Patent Literature 3] Japanese Laid-Open Patent Publication No. JP 2001-076724
[Patent Literature 4] Japanese Laid-Open Patent Publication No. JP 2008-218122

DETAILED DESCRIPTION

Technical Problem

The purpose of the present invention is to provide a Li—Ni composite oxide having a stable crystal structure with high discharge capacity and controlled $Ni^{2+}$ incorporation into a Li site.

Technical Solution

According to one embodiment of the present invention, the composition of the Li—Ni composite oxide particle powder as an example of the cathode active material may be represented by the following Chemical Formula 1.

$$Li_\alpha[(Ni_xCo_y)_{1-\beta}A_\beta]O_z \quad \text{Chemical Formula 1}$$

in the Chemical Formula 1, $0.95 \leq \alpha \leq 1.1$, $0.75 \leq x \leq 0.95$, $0.03 \leq y \leq 0.25$, $0 < \beta \leq 0.2$, and $1.9 \leq z \leq 2.1$, In addition, A is a combination of Al, Ti, and/or Mg as a dopant, and their total content may be 12,000 ppm or less.

More specifically, it may be 10,000 ppm or less, and may be at least 7,000 ppm or more.

When the dopant is comprised less than the above range, it is difficult to expect the effect of stabilizing the crystal structure as the dopant.

When $\alpha$ is smaller than 0.95, Ni is easily incorporated into the Li phase, and the occupancy rate of the metal sites in the lithium site becomes large so that a Li—Ni composite oxide having a high battery capacity cannot be obtained.

Further, when $\alpha$ is larger than 1.1, incorporating of Li into the metal site increases, Ni, which has been driven out of the metal site, incorporates into the Li phase, and the occupancy rate of the metal site of the lithium site increases.

The $\alpha$ is preferably $1.00 \leq \alpha \leq 1.1$, more preferably $1.00 \leq \alpha \leq 1.05$.

In the Chemical Formula 1, y represents the content ratio of Co which is an essential component of this composite oxide.

The lithium-containing composite oxide having y in the above range is structurally stable.

On the other hand, when the content ratio of Co increases and the mol ratio of Co with respect to Ni increases, there is a fear that the Ni valence number decreases.

Accordingly, y is preferably 0.25 or less and more preferably 0.1 or less.

When y is 0, the Yantera strain in which $Ni^{3+}$ becomes $Ni^{4+}$ cannot be suppressed, and the charge and discharge efficiency of the initial charge and discharge cycle decreases.

When y is larger than 0.25, the initial charge and discharge capacity is remarkably lowered, and the cobalt content, which is higher in metal cost, is increased, thereby reducing the advantages of Li—Ni composite oxide, which is lower in metal cost than $LiCoO_2$.

The y is preferably $0.03 \leq y \leq 0.25$, more preferably $0.03 \leq y \leq 0.15$.

z represents the content ratio of oxygen comprised in the composite oxide.

When z is in the range of 1.9 to 2.1, the crystal structure of the lithium-containing composite oxide may be stabilized.

When $\beta$ is larger than 0.2, the charge and discharge capacity of the cathode active material is remarkably decreased, and the advantages of the Li—Ni composite oxide having a large charge and discharge capacity are reduced.

The B is preferably $0.0001 \leq \beta \leq 0.20$, more preferably $0.0002 \leq \beta \leq 0.15$.

Meanwhile, Mn may be excluded from A.

Therefore, a monoclinic structure of the Li—Ni composite oxide of the cathode active material according to the present embodiment is not observed.

In the embodiment of the present invention, the characteristic part of the crystal structure may be represented by the relationship between the c-axis and the a-axis.

The crystal structure of R-3 m is a structure in which a transition metal-oxygen octahedral layer centered on a transition metal is laminated with lithium interposed therebetween.

The lattice constant in the a-axis direction is determined by the action of the distance between the transition metal-transition metal and the distance between lithium-lithium and oxygen-oxygen, and the lattice constant in the c-axis direction is contributed by three layered type in which transition metal-oxygen-lithium-oxygen is laminated.

Here, when the ratio of each transition metal entering the transition metal site of the crystal structure is different or when excessively added lithium is present in the transition metal site, each lattice constant changes since the distance between the transition metal-transition metal and the distance between the transition metal-oxygen changes by the change in the ion radius due to the difference in the ion radius of each element or the valence number change of the transition metal.

Therefore, the ideal crystal structure at R-3m is changed by the amount ratio of the transition metal (Me) and Li (Li/Me) and the dopant element added in addition to the transition metal, so that the lattice constant of the c-axis should basically exceed 3 times the lattice constant of the a-axis, and is adjusted within an additional constant value range by the amount ratio of Li (Li/Me) and the dopant added in addition to the transition metal.

Through this, an optimal or intrinsic range of the relationship between the c-axis and the a-axis according to the increase of the Ni content may be represented, it is represented as $3(a)+5.555 \leq (c) \leq 3(a)+5.580$ (where (a) is a lattice constant of a-axis and (c) is a lattice constant of c-axis) in one embodiment of the present invention.

In the lithium-containing composite oxide having a crystal structure within the above range, it is considered that Li easily diffuses in the lithium layer of the layered structure.

When the lattice constant of the a-axis and the lattice constant of the c-axis satisfy the above relationship, the diffusion resistance of Li is lowered.

The range of average oxidation number is presented to limit their content on the basis of their oxidation state when the same group elements are added simultaneously when transition metal or semimetal is added as dopant in order to respond to required performance of battery.

For example, Ti and Zr are the same group, and even though they have the same tetravalent oxidation state, even if the same amount is added due to the difference in atomic weight, the difference in molar ratio is represented.

At this time, it means that their content is limited on the basis of the oxidation state.

At this time, the oxidation number is the value of the average of all the elements added to the dopants other than Ni and Co, which is referred to as the average oxidation number of the dopant in the specification.

The adjustment of the average oxidation number is basically made of the content of trivalent elements, and further adjustment is made with tetravalent and divalent elements additionally contained.

At this time, since the content of tetravalent is larger than the content of divalent, the average oxidation number is 3<N when the average oxidation number (N) is established.

This means that additionally adjusting by the divalent element after adjusting particle properties through the tetravalent element, at this time, a very small amount of divalent may be added.

The performance of the battery required by the present invention is the discharge capacity and capacity retention rate at 50 cycles when repeating charge and discharge lithium nickel oxide of Ni75 or higher at 4.3V, and in order to satisfy the requirements, the oxidation number condition should be satisfied.

Al and B may be mentioned as an example of the trivalent element.

Al is known as an element that suppresses the desorption of oxygen during repeated charge and discharge of Li—Ni oxide.

However, in terms of content, the range varies depending on the composition and the use, and thus, in the case of the present invention, it may lead to an excessive reduction of the specific capacity in case that if a different composition, in particular, the content of Ni is borrowed as the range applied in the different compositions.

Therefore, it needs to be adjusted to an appropriate content ratio.

However, it is essentially comprised in the oxide system having Ni—Co as a transition metal, and the control of the content ratio of Al is given priority over the control of the content of other dopants.

The B was found to be related with the densification of the particles and was also involved in cation mixing when contained simultaneously with Ti.

For example, when doping simultaneously, the degree of participation in Cation Mixing becomes stronger in an undesirable direction than when doping B or Ti alone.

For this reason, when B is used simultaneously with Ti, the amount needs to be extremely finely adjusted.

Examples of the tetravalent element are Ti and Zr.

Ti is found to be involved in the densification of the particles.

When Zr is applied as a dopant together with Ti, it is confirmed that the ratio of (003)/(104) plays a role in the direction of suppressing cation mixing.

An example of the bivalent element is Mg.

It is confirmed that Mg shows an excellent improved effect with respect to cation mixing when added as a dopant.

However, Mg serves to grow the particle size and to increase the porosity ratio inside the particles simultaneously.

As the porosity ratio increases, it is good to increase the content of Mg in the battery performance tending to the preferred direction, but since the direction of low porosity ratio is regarded as a preferable direction, the content thereof is minimized in one embodiment of the present invention.

Considering the action of each element as described above, the optimum average number of oxides N is $3.05 \leq N \leq 3.35$, more specifically $3.1 \leq N \leq 3.3$.

At this time, it is preferable that the appropriate dopant is trivalent Al, and/or B, tetravalent Ti, and/or Zr, and divalent Mg.

The limit of the average oxidation number is determined by the content of elements having different oxidation states, but this is for the purpose of securing the effect of particle properties as follows.

1. Density of Particles

In order to improve the above-mentioned problems, in particular the problem with respect to safety for $LiNiO_2$, various doping elements, for example electrochemically inert ions, such as $Mg^{2+}$ and $Ti^{4+}$, have been introduced (e.g. refer to U.S. Pat. No. 6,794,085 B2).

However, such doping strategies often do not account for particle density in actual batteries, leading to reduced specific capacity and lower power, which is undesirable for end use.

In order to increase the specific capacity in the Li—Ni compound, the reversible desorption amount of Li should be increased.

However, the increase of the reversible desorption of Li promotes the change of the crystal volume during the charge and discharge cycle, and if this is repeated, unbearable stress is caused to be unbearable by a single particle and it causes the particle breakdown in the electrode.

This phenomenon of particle breakdown causes electrical contact loss in the electrode, which is the ultimate cause of deterioration of the life of the battery.

In order to solve this problem, the present invention provides densification of particles.

What is special in one embodiment of the present invention is that the dopant is used for densification of the particles, and the difference from the conventional method is that the reduction of the specific capacity is minimized.

In the conventional art, for the densification of particles, KR 2016-0123406 suggests Ba, but there is no solution for reducing the initial specific capacity by using Ba, and KR 2015-0015141 mentions substitution of Ti, but does not suggest the correct use of Ni-rich, which maximizes the reversible desorption amount of Li with a Ni content of 75% or more, so that there is no reference point other than the correlation between Ti and particle density.

2. Ratio of c-Axis to a-Axis

The crystal structure of R-3m is a structure in which a transition metal-oxygen octahedral layer centered on a transition metal is laminated with lithium interposed therebetween.

The lattice constant in the a-axis direction is determined by the action of the distance between the transition metal-transition metal and the distance between lithium-lithium and oxygen-oxygen, and the lattice constant in the c-axis direction is contributed by three layered type in which transition metal-oxygen-lithium-oxygen is laminated.

Here, when the ratio of each transition metal entering the transition metal site of the crystal structure is different or when excessively added lithium is present in the transition metal site, each lattice constant changes since the distance between the transition metal-transition metal and the distance between the transition metal-oxygen changes by the change in the ion radius due to the difference in the ion radius of each element or the valence number change of the transition metal.

Therefore, in the ideal crystal structure at R-3m, it is thought that the lattice constant of the c-axis is changed in proportion to three times the lattice constant of the a-axis by the ratio between the transition metals, the change in the ratio of Li to the sum amount of metal component (MT) (Li/MT), and the type and content of dopant added.

Moreover, it is thought that Li diffuses easily in the lithium layer of a layered-type structure in the lithium-containing composite oxide which has the crystal structure of predetermined size with the difference between 3 times the lattice constant of a-axis and the lattice constant of c-axis.

In one embodiment of the present invention, the lattice constant of the a-axis converges to 2.780, and the lattice constant of c-axis converges to 14.191 when the optimal performance is implemented.

In this case, when the lattice constant of the a-axis is set to (a) and the lattice constant of c is set to (c), the relationship $3(a)+5.555 \leq (c) \leq 3(a)+5.580$ (where the lattice constant of the a-axis is 2.780 or more) is satisfied.

The above relationship is represented by a unique value for the performance implementation of Li—Ni oxide of Ni 75% or more in the present invention, and as a result of confirming in the examples other than this value, the case satisfying all performance items was not found.

3. Ratio of I003/I104

In general, when the cathode active material is a layered rock salt type crystal structure which does not comprise lithium excess phase, it is thought that the characteristic of battery deteriorates when the substitution of the transition metal comprised in the transition metal layer and lithium comprised in the lithium layer (hereinafter referred to as "cation mixing") occurs.

As an index of cation mixing, the peak intensity ratio I003/I104 of the XRD measurement result may be used, and in general, it is represented that the larger the I003/I104, the smaller the cation mixing.

As a parameter representing the crystallinity of a layered rock salt type structure lithium transition metal composite oxide, in the present invention, the intensity ratio I003/I104 between the intensity I003 of the diffraction peak on the (003) plane and the intensity I104 of the diffraction peak on the (104) plane by X-ray diffraction analysis using CuKα-rays is adopted.

The diffraction peak of the (003) plane is inherent in the layered rock salt type structure, whereas the diffraction peak of the (104) plane is deduced not only in the layered rock salt type structure but also in the cubic rock salt structure.

Therefore, the greater the intensity ratio I003/I104, the smaller the rock salt domain and the closer to the single phase of the layered type rock salt structure.

That is, crystallinity becomes good.

In the case of the lithium transition metal composite oxide of one embodiment of the present invention, when using this parameter, I003/I104 needs to be 1.6 or more and 1.8 or less.

When it is less than 1.6, battery performance, such as cycle characteristics of the lithium secondary battery used as a cathode active material, may deteriorate.

On the other hand, when it exceeds 1.8, it means that the addition amount of the dopant is excessive, which is a factor of lowering the initial capacity.

In addition, it was confirmed that the intensity ratio I003/I104 depends on the added dopant element.

In particular, it was found that the content of Mg should be optimized in consideration of other demerit phenomena when the element is applied because the influence is large by certain elements such as Mg.

4. Grain Size

In the embodiment, grain size will be demonstrated.

Grain Size in the present invention means the size of the unit lattice (Unit cell or Crystallite), it is represented by the value calculated by the following Sherrer equation.

$$\tau = \frac{K\lambda}{\beta \cos \theta}$$

[Sherrer Equation]
τ: Size of crystal
K: Constant according to crystal (0.89)
λ: Incident X-ray wavelength
β: FWHM
θ: Bragg angle of the peak In one embodiment of the present invention, the optimal range of the grain size is formed by the combination of dopant elements.

As confirmed through the example of the present invention, the grain size proceeds in the direction of decreasing by an increase of Ti and B, and in the direction of increasing by an increase of Mg.

This is related to the adjustment of the dopant element to optimize the density and the I003/I104 ratio of the particles.

As confirmed through the examples of the present invention, the optimum performance was implemented when it was 500 or more and 550 or less in the unit of Angstrom.

In the embodiments of the present invention, the characteristic part of the dopant element may be represented by the relationship between the dopant type and the ratio.

In the present invention, the dopant may comprise Ti, Al, and Mg.

The dopant group should consider the content of elements in terms of capacity, particle density, and crystal structure stability, respectively.

Particularly, in case of Al, it should be essentially comprised because of high contribution to crystal structure stability through oxygen desorption control, and at least 3000 ppm on the basis of transition metal content should be present in order to secure the expected extent of crystal structure stability.

In addition, Ti should be comprised to improve the density of the particles.

As a result of electron scanning microscope (SEM) imaging of the cross section of the particle, a phenomenon in which the porous inside the particle is controlled by the addition of Ti is observed, which is thought to be due to the participation of Ti in the primary particle growth.

As a result of confirming in example, the density of the particles increases according to the content of Ti, which may be confirmed that the porous gradually decreases in the particle cross section.

This correlates with the degree of tolerance to stress in crystals accompanied in repeated charge and discharge cycles, and as a result, this increase in density is found to be directly proportional to the cycle.

However, in the case of the composition containing excessive Ni as in the present invention, it was confirmed that the capacity reduction sensitivity of Ti, that is, the capacity reduction ratio according to the increase of Ti content as a dopant is greater than Al.

In addition, Mg should be comprised to prevent cation mixing phenomenon of the particles.

The powder was measured by XRD (X-Ray Diffraction) to compare the crystal structure factors of each sample, a result was found in a direction preferable in the life characteristics in the sample comprising a certain amount of Mg.

I003/I104, the ratio of c-axis/a-axis, and the like may be exampled as the crystal structure factor.

However, it was confirmed that the capacity reduction sensitivity of Mg was larger than other dopant elements so that it should be contained in the smallest ratio.

Advantageous Effects

The present invention provides a cathode active material having a battery characteristic excellent in crystal structure stability, capacity and life characteristic, a method of manufacturing the same, and a lithium secondary battery comprising the same.

DETAILED DESCRIPTION OF THE EMBODIMENTS

Hereinafter, the embodiments of the present invention will be described in detail.

Meanwhile, it should be understood that the embodiments described herein are merely some examples of the present invention, and accordingly, these are not intended to be limiting and to be defined only by the scope of the claims appended hereto.

In another embodiment of the present invention provides a lithium secondary battery comprising a cathode, a anode and an electrolyte, wherein the cathode comprises a current collector and a cathode active material layer formed on the current collector, wherein the cathode active material layer comprises the above-mentioned cathode active material.

Descriptions related to the cathode active material are omitted as same as described above.

The cathode active material layer may comprise a binder and a conductive material.

The binder serves to appropriately bind cathode active material particles to each other and appropriately bind the cathode active material to the current collector, and as a representative example of the binder, polyvinylalcohol, carboxymethylcellulose, hydroxypropylcellulose, polyvinylchloride, carboxylated polyvinylchloride, polyvinylfluoride, a polymer comprising ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to the electrode, and any material may be used as long as it does not cause chemical changes in a battery to be configured and is an electron-conductive material, and as an example, a conductive material comprising a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

The anode comprises a current collector and an anode active material layer formed on the current collector, and the anode active material layer comprises an anode active material.

An example of the anode active material comprises a material capable of reversibly intercalating and deintercalating lithium ions, a lithium metal, a lithium metal alloy, a material capable of doping and dedoping lithium, or a transition metal oxide.

As the material capable of reversibly intercalating and deintercalating lithium ions, any carbon based anode active material may be used as long as it is generally used as a carbon material in a lithium ion secondary battery, as a representative example, crystalline carbon or amorphous carbon may be used, or crystalline carbon and amorphous carbon may be used together with each other.

Examples of the crystalline carbon may comprise non-shaped or sheet, flake, spherical, or fiber-shaped natural graphite or artificial graphite, and examples of the amorphous carbon may comprise soft carbon (low-temperature fired carbon), hard carbon, mesophase pitch carbide, fired cokes, and the like.

As the lithium metal alloy, an alloy of lithium and a metal selected from the group consisting of Na, K, Rb, Cs, Fr, Be, Mg, Ca, Sr, Si, Sb, Pb, In, Zn, Ba, Ra, Ge, Al, and Sn may be used.

Examples of the material capable of doping and dedoping lithium may comprise Si, $SiO_x$ ($0<x<2$), a Si—Y alloy (Y is an element selected from the group consisting of alkali metals, alkali earth metals, group 13 elements, group 14 elements, transition metals, rare earth elements, and a combination thereof, but is not Si), Sn, $SnO_2$, Sn—Y (Y is an element selected from the group consisting of alkali metals, alkali earth metals, group 13 elements, group 14 elements, transition metals, rare earth elements, and a combination thereof, but is not Sn), and the like, and further, at least one thereof may also be mixed with $SiO_2$ and then used.

The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may comprise vanadium oxide, lithium vanadium oxide, and the like.

The anode active material layer may also comprise a binder, and selectively, the anode active material layer may further comprise a conductive material.

The binder serves to appropriately bind anode active material particles to each other and appropriately bind the anode active material to the current collector, and as a representative example of the binder, polyvinylalcohol, carboxymethylcellulose, hydroxypropylcellulose, polyvinylchloride, carboxylated polyvinylchloride, polyvinylfluoride, a polymer comprising ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to the electrode, and any material may be used as long as it does not cause chemical changes in a battery to be configured and is an electron-conductive material, and as an example, a conductive material comprising a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

As the current collector, a material selected from the group consisting of copper foil, nickel foil, stainless steel foil, titanium foil, nickel foam, copper foam, a polymer substrate coated with a conductive metal, and a combination thereof may be used.

As a material of the current collector, Al may be used, but is not limited thereto.

The anode and the cathode may be manufactured by mixing active materials, the conductive material, and the binder in a solvent to prepare active material compositions, and applying the compositions on the current collector, respectively.

Since a method of manufacturing an electrode as described above is well-known in the art, a detailed description thereof will be omitted in the present specification.

As the solvent, N-methylpyrrolidone, or the like, may be used, but the solvent is not limited thereto.

The cathode and the anode may be separated by a separator, and as the separator, any separator may be used as long as it is commonly used in lithium batteries.

In particular, it is suitable to have low resistance to ion migration of the electrolyte and excellent ability to contain the electrolyte.

For example, a material selected from glass fiber, polyester, teflon, polyethylene, polypropylene, polytetrafluoroethylene (PTFE), and combinations thereof may be in the form of a nonwoven or woven fabric.

The separator has a pore diameter of 0.01 to 10 μm and of which a thickness of 5 to 300 μm may be used.

The lithium salt-containing non-aqueous electrolyte consists of a non-aqueous electrolyte and lithium.

As the non-aqueous electrolyte, a non-aqueous electrolyte solution, a solid electrolyte, an inorganic solid electrolyte, or the like are used.

As the non-aqueous electrolyte solution, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolon, formamide, dimethylformamide, dioxolon, acetonitrile, nitromethane, methyl formate, methyl acetate, phosphate triester, trimethoxy methane, dioxorone derivatives, sulfolane, methyl sulfolane, 1,3-dimethyl-2-imidazolidinone, propylene carbonate derivatives, tetrahydrofuran derivatives, ethers, methyl pyroionate and ethyl propionate, or the like may be used.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, polymers comprising ionic dissociating groups, or the like may be used.

As the inorganic solid electrolyte, nitride, halide, sulfate, silicate of Li, or the like can be used, for example $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt may be used as long as it is commonly used in lithium batteries, as a material which is good to dissolve in the non-aqueous electrolyte, for example, at least one from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl boronate, imide and the like may be used.

Lithium secondary batteries may be classified as a lithium ion battery, a lithium ion polymer battery, and a lithium polymer battery depending on the kinds of separator and electrolyte used therein, be classified as a cylindrical battery, a prismatic battery, a coin type battery, a pouch type battery, and the like, depending on a shape thereof, and be classified as a bulk type battery and a thin film type battery depending on a size thereof.

In addition, both lithium primary batteries and lithium secondary batteries are possible.

Since structures and manufacturing methods of these batteries are well-known in the art, a detailed description thereof will be omitted.

Figure 1:
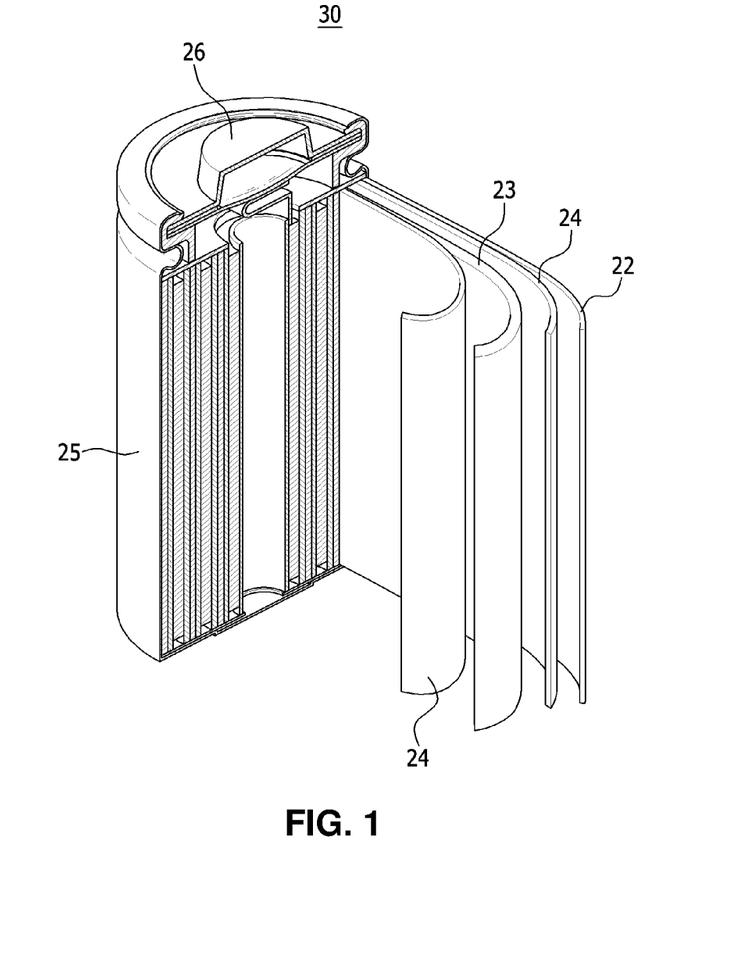
FIG. 1 is a schematic view of a lithium secondary battery according to one embodiment of the present invention.
Figure 2:
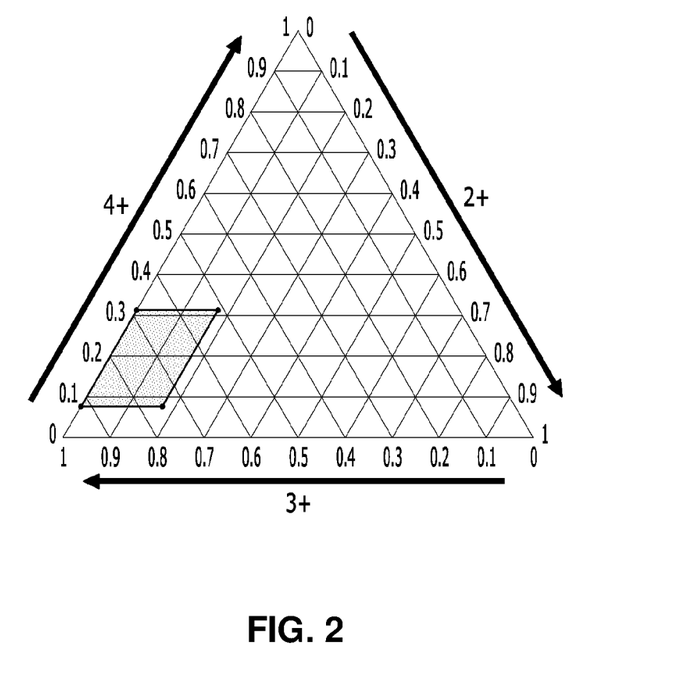
FIG. 2 is a schematic diagram of the content range of a representative dopant.
Figure 3:
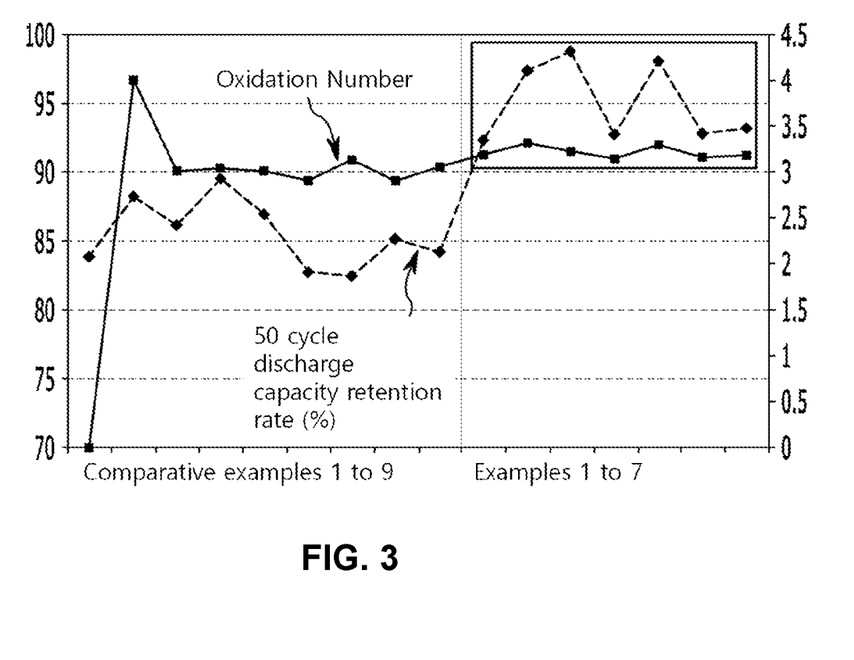
FIG. 3 shows the relationship between the oxidation number and the cycle capacity retention rate of one Example and Comparative Examples of the present invention.

FIG. 1 schematically illustrates a representative structure of a lithium secondary battery according to one embodiment of the present invention.

Referring to FIG. 1, the lithium battery 30 comprises a cathode 23, an anode 22, and a separator 24 disposed between the cathode 23 and the anode 22.

The cathode 23, the anode 22, and the separator 24 described above are wound or folded to be accommodated in the battery container 25.

Subsequently, an electrolyte is injected into the battery container 25 and encapsulated with an encapsulation member 26 to complete the lithium battery 30.

The battery container 25 may be cylindrical type, prismatic type, thin film type, or the like.

The lithium battery may be a lithium ion battery.

The lithium battery is suitable for the use requiring high capacity, high output, and high temperature operation, such as electric vehicles, in addition to the use of conventional mobile phones, portable computers, and the like, and it may also be used in hybrid vehicles in combination with existing internal combustion engines, fuel cells, and supercapacitors.

In addition, the lithium battery may be used for all other uses requiring high output, high voltage, and high temperature operation.

Hereinafter, the present invention will be described with reference to some preferred examples and comparative examples.

However, the examples are described herein to illustrate certain preferred embodiments of the present invention, and the present invention is not limited thereto.

Example: Preparation of Cathode Active Material

To obtain the desired cathode active materials of Examples 1 to 7, and Comparative Examples 1 to 9, $Ni_{0.9}Co_{0.1}(OH)_2$, which is a nickel-based metal hydroxide precursor, and LiOH, which is a lithium supply material, were dry mixed with a lab mixer.

Next, according to each Examples and Comparative Examples, $TiO_2$ which is Ti supply material and $B_2O_3$ which is B raw material, $Mg(OH)_2$ which is Mg raw material, $Al(OH)_2$ which is Al raw material, and $ZrO_2$ which is Zr raw material were mixed uniformly dry.

A total of 4.0 kg of the dry mixture is filled in a mullite saggar and fired in a box-type sintering furnace in an air atmosphere, at elevated temperature of 6.56 hr, holding 16.88 hr and cooling 6.56 hr (Total 30 hrs firing at a temperature condition of 755° C.) for a total of 30 hours.

Specific dopant content of the prepared active material is shown in Table 1 below.

TABLE 1

| | Doping contents (ppm, on the basis of the total weight of the active material) | | | | | | Doping ratio (ppm, on the basis of the total weight of the active material) | | | | | | Average Oxidation |
|---|---|---|---|---|---|---|---|---|---|---|---|---|---|
| | Al | B | Mg | Ti | Zr | total | Al | B | Mg | Ti | Zr | total | Number |
| Comparative Example 1 | 0 | 0 | 0 | 0 | | 0 | | | | | | | — |
| Comparative Example 2 | | | 5000 | | | 5000 | 0.000 | 0.000 | 0.000 | 1.000 | 0.000 | 1.000 | 4.00 |
| Comparative Example 3 | 5000 | | | | | 5000 | 1.000 | 0.000 | 0.000 | 0.000 | 0.000 | 1.000 | 3.00 |
| Comparative Example 4 | 5000 | 0 | 0 | 500 | | 5500 | 0.956 | 0.000 | 0.000 | 0.044 | 0.000 | 1.000 | 3.04 |
| Comparative Example 5 | 5000 | 0 | 2000 | 5000 | | 12000 | 0.525 | 0.000 | 0.233 | 0.241 | 0.000 | 1.000 | 3.01 |
| Comparative Example 6 | 5000 | 0 | 3000 | 5000 | | 13000 | 0.470 | 0.000 | 0.313 | 0.216 | 0.000 | 1.000 | 2.90 |
| Comparative Example 7 | 10000 | 0 | 500 | 5000 | | 15500 | 0.778 | 0.000 | 0.043 | 0.179 | 0.000 | 1.000 | 3.14 |
| Comparative Example 8 | 5000 | 0 | 1000 | 1000 | | 7000 | 0.761 | 0.000 | 0.169 | 0.070 | 0.000 | 1.000 | 2.90 |
| Comparative Example 9 | 10000 | 0 | 200 | 2000 | | 12200 | 0.898 | 0.000 | 0.020 | 0.083 | 0.000 | 1.000 | 3.06 |
| Example 1 | 5000 | 0 | 0 | 2500 | | 7500 | 0.813 | 0.000 | 0.000 | 0.187 | 0.000 | 1.000 | 3.19 |
| Example 2 | 5000 | 0 | 0 | 5000 | | 10000 | 0.685 | 0.000 | 0.000 | 0.315 | 0.000 | 1.000 | 3.31 |
| Example 3 | 5000 | 0 | 500 | 5000 | | 10500 | 0.637 | 0.000 | 0.071 | 0.293 | 0.000 | 1.000 | 3.22 |
| Example 4 | 5000 | 0 | 1000 | 5000 | | 11000 | 0.595 | 0.000 | 0.132 | 0.273 | 0.000 | 1.000 | 3.14 |
| Example 5 | 3000 | 0 | 500 | 5000 | | 8500 | 0.513 | 0.000 | 0.095 | 0.393 | 0.000 | 1.000 | 3.30 |
| Example 6 | 8000 | 0 | 500 | 5000 | | 13500 | 0.737 | 0.000 | 0.051 | 0.212 | 0.000 | 1.000 | 3.16 |
| Example 7 | 5000 | 0 | 500 | 2500 | 2500 | 10500 | 0.672 | 0.000 | 0.075 | 0.154 | 0.099 | 1.000 | 3.18 |

The kind and content ratio of the metal element comprised in the complex oxide are measured by ICP (high frequency inductive coupling plasma) measurement.

Further, since the raw material of manufactures, input ratio thereof, and the analysis value of ICP are almost corresponded, when the composite oxide cannot be measured by ICP, the kind and content ratio of the metal element comprised in the composite oxide are computed from the input ratio of the raw material of manufactures.

Further, the structure of the active material was confirmed through XRD, and the results are shown in Table 2 below.

TABLE 2

| | XRD | | | | | |
|---|---|---|---|---|---|---|
| List | (003)/(104) | R-factor | a | c | Grain size (Å) | c-axis/a-axis |
| Comparative Example 1 | 1.621 | 0.413 | 2.872 | 14.2 | 563 | 4.943 |
| Comparative Example 2 | 1.675 | 0.419 | 2.872 | 14.19 | 530 | 4.939 |
| Comparative Example 3 | 1.622 | 0.406 | 2.872 | 14.18 | 554 | 4.938 |
| Comparative Example 4 | 1.621 | 0.419 | 2.872 | 14.81 | 564 | 5.157 |
| Comparative Example 5 | 1.705 | 0.421 | 2.872 | 14.19 | 569 | 4.94 |
| Comparative Example 6 | 1.765 | 0.416 | 2.872 | 14.29 | 593 | 4.975 |
| Comparative Example 7 | 1.65 | 0.408 | 2.871 | 14.19 | 555 | 4.943 |
| Comparative Example 8 | 1.687 | 0.411 | 2.871 | 14.19 | 584 | 4.942 |
| Comparative Example 9 | 1.6 | 0.437 | 2.872 | 14.19 | 542 | 4.94 |
| Example 1 | 1.65 | 0.419 | 2.872 | 14.86 | 547 | 5.174 |
| Example 2 | 1.657 | 0.42 | 2.872 | 14.19 | 524 | 4.941 |
| Example 3 | 1.655 | 0.406 | 2.872 | 14.19 | 530 | 4.941 |
| Example 4 | 1.687 | 0.411 | 2.871 | 14.2 | 562 | 4.946 |
| Example 5 | 1.65 | 0.405 | 2.871 | 14.19 | 572 | 4.941 |
| Example 6 | 1.65 | 0.413 | 2.871 | 14.2 | 560 | 4.946 |
| Example 7 | 1.674 | 0.405 | 2.872 | 14.19 | 547 | 4.941 |

Example: Manufacturing of Coin Cell 90 wt % of each of the cathode active materials prepared in Examples and Comparative Examples, 5 wt % of carbon black as a conductive material, and 5 wt % of polyvinylidene fluoride (PVDF) as a binder were added to 5.0 wt % of N-methyl-2 pyrrolidone (NMP) as a solvent, thereby preparing cathode slurry.

The cathode prepared slurry was applied onto an aluminum (Al) thin film (thickness: 20 to 40 μm) corresponding to a cathode current collector, vacuum-dried, and roll-pressed, thereby manufacturing a cathode.

As an anode, a Li metal was used.

A coin-cell type half-cell was manufactured using the cathode manufactured as described above, the Li metal as a counter electrode, and 1.0M LiPF6 in ethylene carbonate (EC):dimethyl carbonate (DMC) (1:1 vol %) as an electrolyte.

Charge and discharge were performed in a range of 4.3 to 2.75V.

The results are shown in Table 3 below.

TABLE 3

| List | 1st CC | 1st DC | 1st Eff (%) | 30th CC | 30th DC | 30th Eff (%) | 50th CC | 50th DC | 50th Eff (%) | 30/1 % | 50/1 % |
|---|---|---|---|---|---|---|---|---|---|---|---|
| Comparative Example 1 | 220.7 | 199 | 90.16 | 186.4 | 182.1 | 97.7 | 171.94 | 167.2 | 97.25 | 91.66 | 83.98 |
| Comparative Example 2 | 222.3 | 200.7 | 90.3 | 195.6 | 191.3 | 97.8 | 182.38 | 177.5 | 97.31 | 95.1 | 88.18 |
| Comparative Example 3 | 215.6 | 194.6 | 90.23 | 187.4 | 183.3 | 97.79 | 172.34 | 167.8 | 97.39 | 94.07 | 86.15 |
| Comparative Example 4 | 214.1 | 191.5 | 89.42 | 192.6 | 190.2 | 98.76 | 187.99 | 171.3 | 91.13 | 99.37 | 89.48 |
| Comparative Example 5 | 203.1 | 183.2 | 90.2 | 190.3 | 173.3 | 91.03 | 184.23 | 159.2 | 86.42 | 94.55 | 86.89 |
| Comparative Example 6 | 198.5 | 180.5 | 90.97 | 186.2 | 168.6 | 90.56 | 174.55 | 149.3 | 85.55 | 93.4 | 82.71 |
| Comparative Example 7 | 193.4 | 178.5 | 92.26 | 180.5 | 161.1 | 89.27 | 168.47 | 147.1 | 87.32 | 90.27 | 82.43 |
| Comparative Example 8 | 212.4 | 193.1 | 90.92 | 188.5 | 180.9 | 95.98 | 169.54 | 164.4 | 96.96 | 93.59 | 85.06 |
| Comparative Example 9 | 205.7 | 188.1 | 91.44 | 178 | 173.7 | 97.58 | 162.404 | 158.4 | 97.51 | 92.36 | 84.19 |
| Example 1 | 210.5 | 190.8 | 90.64 | 190.2 | 189.8 | 99.75 | 186.74 | 176.2 | 94.38 | 99.49 | 92.39 |
| Example 2 | 205.8 | 187.5 | 91.11 | 191.6 | 188.6 | 98.4 | 186.52 | 182.7 | 97.96 | 100.5 | 97.43 |
| Example 3 | 204.6 | 188.9 | 92.29 | 192.5 | 190.4 | 98.92 | 188.29 | 186.1 | 98.85 | 100.8 | 98.56 |
| Example 4 | 204.8 | 184.5 | 90.08 | 191.7 | 180.5 | 94.17 | 186.94 | 171 | 91.49 | 97.84 | 92.73 |
| Example 5 | 204.8 | 190.1 | 92.83 | 192.5 | 190.5 | 99 | 188.54 | 186.2 | 98.78 | 100.2 | 97.96 |
| Example 6 | 203.4 | 184.8 | 90.85 | 191.3 | 180.5 | 94.4 | 186.47 | 171.5 | 91.95 | 97.7 | 92.78 |
| Example 7 | 203.4 | 185.2 | 91.05 | 191.3 | 181 | 94.66 | 186.47 | 172.5 | 92.48 | 97.75 | 93.11 |

With respect to the cycle characteristics when Ti alone or Al alone, it may be confirmed that the discharge capacity retention rate is increased at 50 cycles than when two elements are simultaneously applied.

However, even when using Ti and Al simultaneously, it may be confirmed that the cycle characteristics change with the change of the content of Ti.

This may be confirmed that the cycle capacity retention rate is excellent when the average oxidation number N of the dopant is 3.05≤N≤3.35, and when the grain size is 500 to 550 Angstroms.

After fixing the content of Al and Ti, it is confirmed that the initial discharge capacity decreases rapidly as the content of Mg increases.

In addition, it is confirmed that the particle density is reduced, and the cycle characteristics is reduced.

However, in the case of the addition of a small amount compared to the dopant together, even it may be confirmed that the cycle increases.

The ratio at this time is a molar ratio, which is smaller than Al and Ti, and satisfies that 3<N when expressed by the oxidation number N of the dopant.

It may be observed that Mg is participated in the ratio of I003/I104, and in the case of the addition of a predetermined amount, it may be confirmed that the effect is represented on the cycle performance by the relationship with other dopants.

At this time, the preferable range of N is 3.05<N.

Since the change in the Al content does not show a difference in a small range, when the range is widened, that is, when about 8000 ppm by addition amount is added, it confirms that it represents the implementation of preferable performance.

At this time, the total amount of dopant addition is less than 15,000 ppm.

At this time, the dopant oxidation number N converges to N, but satisfies the range of 3.05≤N≤3.35 by the tetravalent dopant.

When seeing the results of when replacing part of Ti with Zr, it shows an effect with improvement in I003/I104, which indicates the degree of cation mixing.

Because of this, it is confirmed that Ti and Zr may be used together as a tetravalent element.

DESCRIPTION OF SYMBOLS

30: Lithium Battery
22: Anode
23: Cathode
24: Separator
25: Battery container
26: Encapsulation member

What is claimed is:

1. A cathode active material, represented by the following Chemical Formula 1, wherein
   I003/I104 ratio is 1.6 or more, and
   R-factor value represented by the following Formula 1 is 0.40 to 0.44, and
   c-axis lattice constant (c) and a-axis lattice constant (a) satisfy $3(a)+5.555 \leq (c) \leq 3(a)+5.580$:

$$R\text{-factor} = (I102 + I006)/(I101) \qquad \text{Formula 1}$$

wherein I003, I006, I101, I102, and I104 are the intensity of diffraction peaks on the (003), (006), (101), (102), and (104) planes by X-ray diffraction analysis using CuKα-rays, $$Li_\alpha[(Ni_xCo_y)_{1-\beta}A_\beta]O_z \qquad \text{Chemical Formula 1}$$

in the Chemical Formula 1,
   $0.95 \leq \alpha \leq 1.1$, $0.75 \leq x \leq 0.95$, $0.03 \leq y \leq 0.25$, $0 < \beta \leq 0.2$, and $1.9 \leq z \leq 2.1$,
   and A is a dopant metal element, and the average oxidation number N of A is $3.05 \leq N \leq 3.35$.

2. The cathode active material of claim 1, wherein $0.88 \leq x \leq 0.92$, and $0.08 \leq y \leq 0.12$, in the Chemical Formula 1.

3. The cathode active material of claim 1, wherein the content of the dopant A is 12,000 ppm or less on the basis of the total weight of the active material.

4. The cathode active material of claim 1, wherein the content of the dopant A is 10,000 ppm or less on the basis of the total weight of the active material.

5. The cathode active material of claim 1, wherein the formation discharge capacity at (Li/Li⁺) 4.3V of the coin cell comprising the cathode active material is 200mAh/g or more.

6. The cathode active material of claim 1, wherein when charge and discharge at (Li/Li⁺) 4.3V of the coin cell comprising the cathode active material, the discharge capacity is 180 mAh/g or more in the $50^{th}$ cycle.

7. The cathode active material of claim 6, wherein when charge and discharge at (Li/Li⁺) 4.3V of the coin cell comprising the cathode active material, the $1^{st}$ cycle capacity÷$50^{th}$ cycle capacity ratio is 95% or more.

8. The cathode active material of claim 1, wherein the grain size of the cathode active material is 500 or more and 550 or less in Angstrom units.

9. A lithium secondary battery comprising:
a cathode comprising the cathode active material according to claim 1;
an anode comprising an anode active material; and
an electrolyte.

10. A cathode active material, represented by the following Chemical Formula 1, wherein I003/I104 ratio is 1.6 or more, and R-factor value represented by the following Formula 1 is 0.40 to 0.44, and c-axis lattice constant (c) and a-axis lattice constant (a) satisfy $3(a)+5.555 \leq (c) \leq 3(a)+5.580$:

$$R\text{-factor} = (I102 + I006)/(I101) \quad \text{[Formula 1]}$$

wherein I003, I006, I101, I102, and I104 are the intensity of diffraction peaks on the (003), (006), (101), (102), and (104) planes by X-ray diffraction analysis using CuKα-rays, $$Li_\alpha[(Ni_xCo_y)_{1-\beta}A_\beta]O_z \quad \text{[Chemical Formula 1]}$$

in the Chemical Formula 1,
$0.95 \leq \alpha \leq 1.1$, $0.75 \leq x \leq 0.95$, $0.03 \leq y \leq 0.25$, $0 < \beta \leq 0.2$, and $1.9 \leq z \leq 2.1$,
and A is a dopant metal element, and the average oxidation number N of A is $3.05 \leq N \leq 3.35$,
and Mn is excluded from A.

11. The cathode active material of claim 10, wherein $0.88 \leq x \leq 0.92$, and $0.08 \leq y \leq 0.12$, in the Chemical Formula 1.

12. The cathode active material of claim 10, wherein the content of the dopant A is 12,000 ppm or less on the basis of the total weight of the active material.

13. The cathode active material of claim 10, wherein the content of the dopant A is 10,000 ppm or less on the basis of the total weight of the active material.

14. The cathode active material of claim 10 wherein the formation discharge capacity at (Li/Li$^+$) 4.3V of the coin cell comprising the cathode active material is 200mAh/g or more.

15. The cathode active material of claim 10, wherein when charge and discharge at (Li/Li$^+$) 4.3V of the coin cell comprising the cathode active material, the discharge capacity is 180 mAh/g or more in the 50$^{th}$ cycle.

16. The cathode active material of claim 15, wherein when charge and discharge at (Li/Li$^+$) 4.3V of the coin cell comprising the cathode active material, the 1$^{st}$ cycle capacity÷50$^{th}$ cycle capacity ratio is 95% or more.

17. The cathode active material of claim 10, wherein the grain size of the cathode active material is 500 or more and 550 or less in Angstrom units.

* * * * *